(12) United States Patent
Yang et al.

(10) Patent No.: US 8,213,165 B2
(45) Date of Patent: Jul. 3, 2012

(54) KEY ASSEMBLY AND PORTABLE ELECTRONIC DEVICE USING THE SAME

(75) Inventors: Mu-Wen Yang, Taipei Hsien (TW); Chih-Chiang Chang, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 401 days.

(21) Appl. No.: 12/502,308

(22) Filed: Jul. 14, 2009

(65) Prior Publication Data

US 2010/0053872 A1 Mar. 4, 2010

(30) Foreign Application Priority Data

Aug. 29, 2008 (CN) .......................... 2008 1 0304291

(51) Int. Cl.
*G06F 1/16* (2006.01)
(52) U.S. Cl. ...................... 361/679.08; 341/22; 200/339; 200/552; 200/553; 361/679.02; 361/679.3
(58) Field of Classification Search .............. 361/679.08
See application file for complete search history.

(56) References Cited

U.S. PATENT DOCUMENTS

| | | | | |
|---|---|---|---|---|
| 4,103,126 A * | 7/1978 | DeNigris et al. | ............. | 200/557 |
| 5,329,278 A * | 7/1994 | Dombroski | .................... | 341/20 |
| 6,633,011 B2 * | 10/2003 | Ogawa et al. | ................. | 200/343 |
| 7,094,983 B2 * | 8/2006 | Tsunemoto | ................... | 200/339 |
| 2008/0088489 A1 * | 4/2008 | Moon | ............................. | 341/22 |
| 2008/0230360 A1 * | 9/2008 | Wada et al. | .................... | 200/339 |
| 2009/0033521 A1 * | 2/2009 | Ladouceur et al. | ............. | 341/22 |

* cited by examiner

*Primary Examiner* — Anthony Q Edwards
(74) *Attorney, Agent, or Firm* — Altis Law Group, Inc.

(57) ABSTRACT

A key assembly comprises a base plate, a connecting member, a first key and a second key. The base plate has an opening defined therein. The connecting member is rotatably accommodated in the opening. The first key is rotatably hinged one side of the connecting member. The second key is rotatably hinged another side of the connecting member opposite to the first key. When the first key or the second key is pressed, the pressed key is rotated toward the base plate and rotates the connecting member, and the connecting member rotates the non-pressed key away from the base plate.

20 Claims, 4 Drawing Sheets

KEY ASSEMBLY AND PORTABLE ELECTRONIC DEVICE USING THE SAME

This application is related to co-pending U.S. patent application Ser. Nos. 12/502,302 and 12/502,297, entitled "KEY ASSEMBLY AND PORTABLE ELECTRONIC DEVICE USING THE SAME", by Mu-Wen Yang et al. Such applications have the same assignee and inventorship as the present application and has been concurrently filed herewith. The above-identified applications are incorporated herein by reference.

BACKGROUND

1. Technical Field

The exemplary disclosure generally relates to key assemblies, and particularly to key assemblies used in portable electronic devices.

2. Description of Related Art

With the development of smaller and lighter electronic devices for portable use, key assemblies become more compact with individual keys more tightly spaced. Unfortunately, users of these portable electronics sometimes experience difficulty in activating keys that are close together; multiple and/or erroneous keys may be activated at the same time. This drawback exists not only in cellular telephones, but other portable electronic devices with key assemblies. Also, keys of the key assemblies can be too crowded to allow quick, accurate activation.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the exemplary key assembly and portable electronic device using key assembly. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
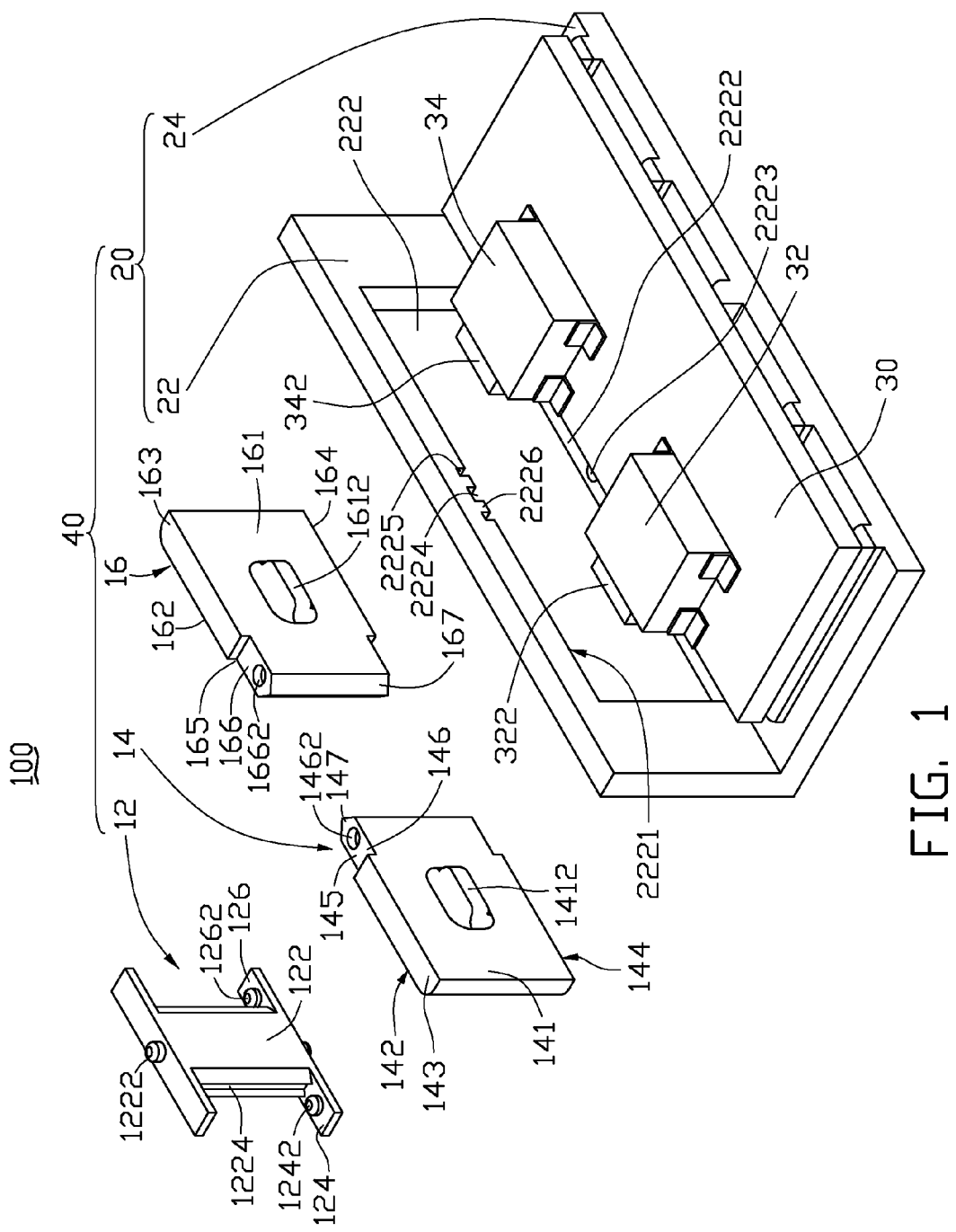
FIG. 1 is an exploded view of an exemplary embodiment of a key assembly used in a portable electronic device, the portable electronic device including the key assembly, a housing, and a circuit board.

Referring to FIG. 1, an exemplary embodiment of a key assembly 40 can be used on a portable electronic device 100, such as a cellular phone or any electronic device where a key assembly is desirable. The portable electronic device 100 includes a circuit board 30 and a key assembly 40 configured to control the circuit board 30. The circuit board 30 has a first switch 32 and a second switch 34 spaced from the first switch 32. The key assembly 40 is configured to press the first contact 322 and the second contact 342, so as to control the circuit board 30.

The key assembly 40 includes a base plate 20, a connecting member 12 rotatably mounted to the base plate 20, and, a first key 14 and a second key 16, both of which are rotatably mounted to the base plate 20. The base plate 20 may be a portion of the housing of the portable electronic device 100 or may be a separate element mounted to the housing of the portable electronic device 100. In this exemplary embodiment, the base plate 10 is a portion of the housing of the portable electronic device 100.

The connecting member 12 includes a main body 122, two spaced apart first connecting sections 124 protruding from one side of the main body 122 and facing the first key 14, and two spaced apart second connecting sections 126 protruding from another side of the main body 122 and facing the second key 16. The main body 122 has a first slot 1224 defined between the first connecting sections 124. The cross-section of the first slot 1224 is substantially trapezoidal and the first slot 1224 is configured to engage with the first key 14. The main body 122 further has a second slot 1226 (seen FIG. 2) defined between the second connecting sections 126. The cross-section of the second slot 1226 is substantially trapezoidal and the second slot 1226 is configured to engage with the second key 16. Each first connecting section 124 has a first shaft 1242 protruding therefrom, and the first shafts 1242 are opposite to and coaxial with each other. Each second connecting section 126 has a second shaft 1262 protruding therefrom, and the second shafts are opposite to and coaxial with each other. The main body 122 has two third shafts 1222 protruding from two ends thereof, the third shafts 1222 are opposite to and coaxial with each other.

The first key 14 is substantially rectangular, however, other shapes may be substituted. The first key 14 has a first contacting surface 141, a first operating surface 142 located opposite to the first contacting surface 141, a first top surface 143 connecting the first contacting surface 141 with the first operating surface 142, a first bottom surface 144 opposite to the first top surface 143. The first contacting surface 141 has a first contacting portion 1412 protruding from near the center thereof. The first contacting portion 1412 is configured for triggering the first switch 32. The first contacting portion 1412 may be constructed from injection-molded thermoplastic elastomer and configured to produce a point contact sensation in a user's fingertip to provide tactile feedback when a user presses the first key 14. The first operating surface 142 may have a first indicia 1422 (seen FIG. 2) defined thereon, to indicate the function of the first key 14. The first indicia 1422 may be, e.g., "+", to indicate the functions of the first key 14 is increasing volume. The first top surface 143 and the first bottom surface 144 respectively has a first notch 145 defined therein for accommodating the first connecting sections 124, and each first notch 145 has a first bottom wall 146 is formed therein. Each first bottom wall 146 defines a first aperture 1462 configured for accommodating the first shaft 1242. The first key 14 has a V-shaped first protrusion 147 protruding from an end thereof facing the main body 122, the first protrusion 147 is accommodated in the first slot 1224 of the main body 122.

The second key 16 is substantially rectangular, however, other shapes may be substituted. The second key 16 has a second contacting surface 161, a second operating surface 162 located opposite to the second contacting surface 161, a second top surface 163 connecting the second contacting surface 161 with the second operating surface 162, a second bottom surface 164 opposite to the second top surface 163. The second contacting surface 161 has a second contacting portion 1612 protruding from near the center thereof. The second contacting portion 1612 is configured for triggering the second switch 34. The second contacting portion 1612 may be constructed from injection-molded thermoplastic elastomer and configured to produce a point contact sensation in a user's fingertip to provide tactile feedback when a user presses the second key 16. The second operating surface 162 may have an first indicia 1622 (seen FIG. 2) defined thereon, to indicate the function of the second key 16. The second indicia 1622 may be, e.g., "−", to indicate the functions of the second key 16 is decreasing volume. The second top surface 163 and the second bottom surface 164 respectively has a second notch 165 defined therein for accommodating the second connecting sections 126, and each notch 165 has a second bottom wall 166 is formed therein. Each second bottom wall 166 defines a second aperture 1662 configured for accommodating the second shaft 1262. The second key 16 has a V-shaped second protrusion 167 protruding from an end thereof facing the main body 122, the second protrusion 167 is accommodated in the second slot 1226 of the main body 122.

The base plate 20 includes a peripheral wall 22 and a bottom wall 24 substantially perpendicularly connected to the peripheral wall 22. The peripheral wall 22 has an opening 222 defined therein. The opening 222 is sized and configured to be engaged with the connecting member 12, the first key 14 and the second key 16. The peripheral wall 22 has a first inner wall 2221 and a second inner wall 2222 opposite to the first inner wall 2221, both of which are defined in the hole 222. The first inner wall 2221 is parallel to the bottom wall 24 and the second inner wall 2222 is level with the bottom wall 24.

Figure 2:
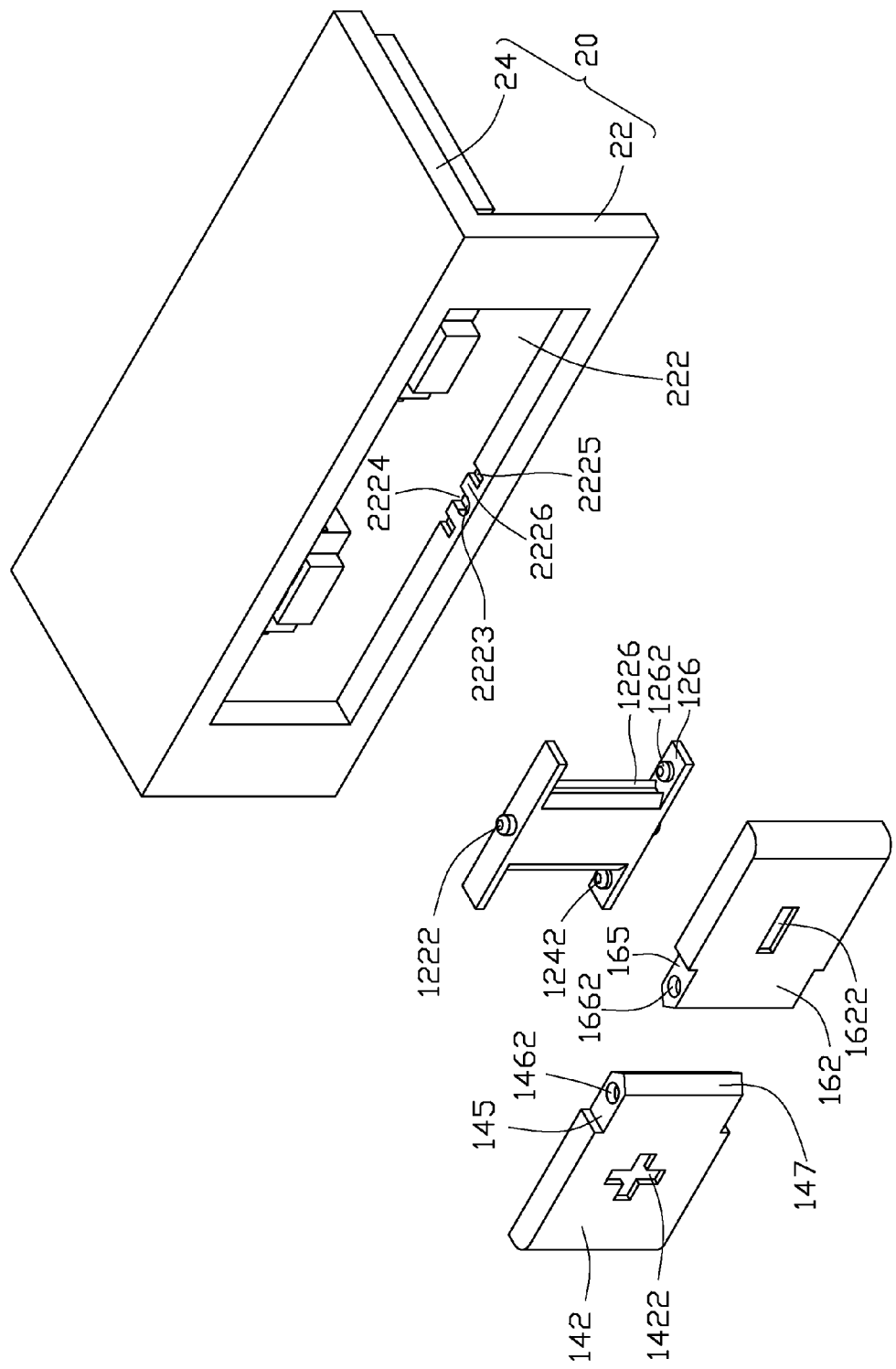
FIG. 2 is similar to FIG. 1, but showing the portable electronic device in another aspect.

Referring to FIG. 2, the first inner wall 2221 and the second inner wall 2222 respectively defines a third aperture 2223 therein corresponding to the third shafts 1222, and the third apertures 2223 are opposite and coaxial. The cross-section of the third aperture 2223 is the same size and shape as the third shaft 1222 and is configured to accommodate the third shaft 1222 therein. The first inner wall 2221 has a guiding groove 2224 defined adjacent to the third aperture 2223 of the first inner wall 2221, and one end of the guiding groove 2224 is communicated with the third aperture 2223 of the first inner wall 2221, the other end of the guiding groove 2224 is communicated with an inner surface of the peripheral wall 22. The cross-section of the guiding groove 2224 is rectangular and the width of the guiding groove 2224 is smaller than the diameter of the third shaft 1222. The guiding groove 2224 is configured to guide the third shaft 1222 into the aperture 2223 of the first inner wall 2221.

The first inner wall 2221 defines two troughs 2225 adjacent two opposite sides of the guiding groove 2224, thus forming two expanding portion 2226 located adjacent to the two sides of the guiding groove 2224. When the third shaft 1222 moves into the guiding grooves 2224, the expanding portion 2226 are bent toward the troughs 2225 to enlarge the guiding grooves 2224 such that the third shaft 1222 easily enter into the third aperture 2223 communicating the guiding groove 2224.

Figure 3:
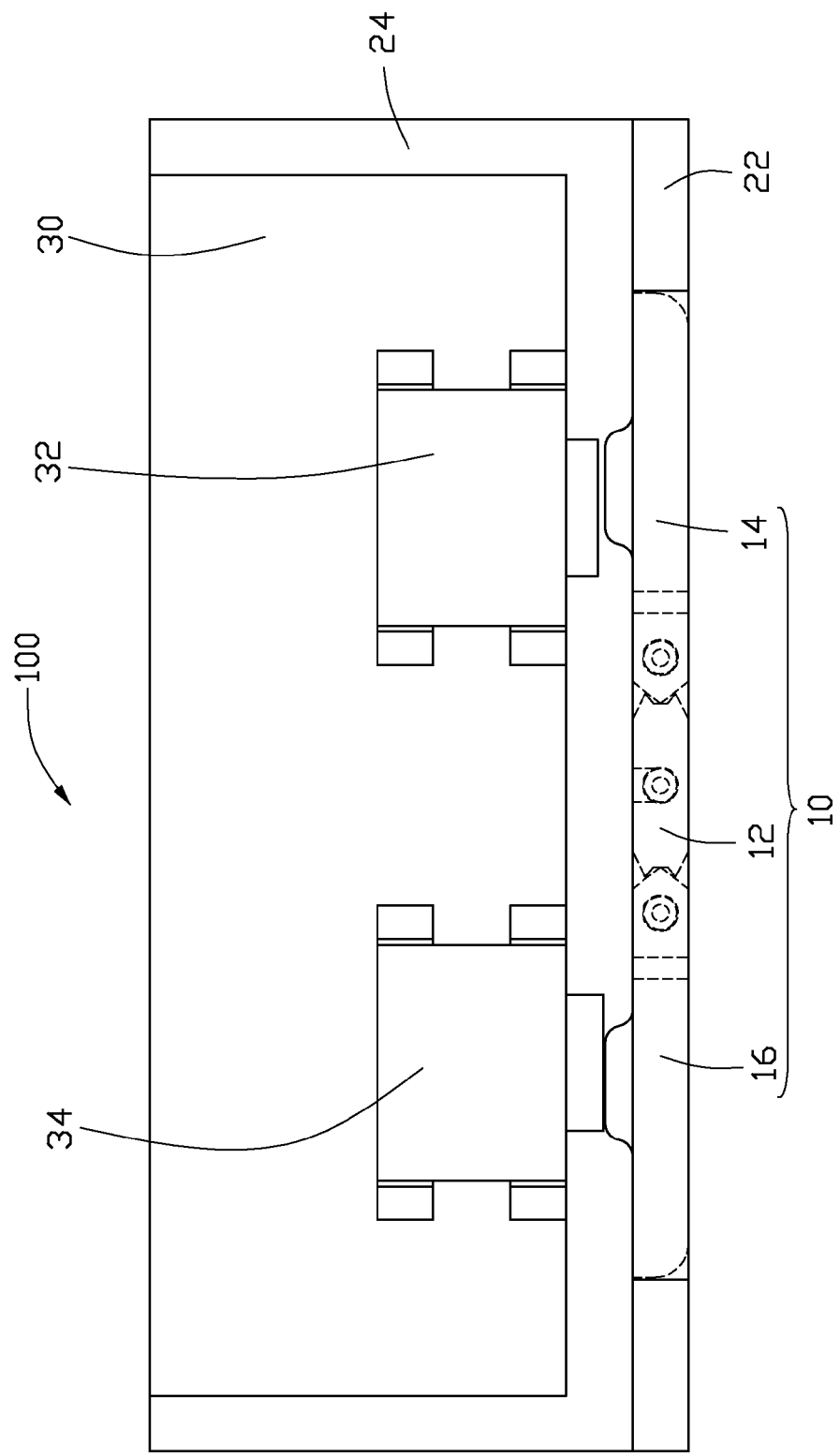
FIG. 3 is a perspective view as the portable electronic device shown in FIG. 1 is assembled.

Referring to FIGS. 1 to 3, to assemble the portable electronic device 100, first, the first connecting sections 124 are bent away from each other to enlarge the distance between the first connecting sections 124. Second, portion of the first key 16 is located between the first connecting sections 124. At this time, the first connecting sections 124 are aligned with the first notches 145, and the first shafts 1242 are aligned with the first apertures 1462. Third, the first connecting sections 124 are released and rebound until the connecting sections 124 are accommodated in corresponding notches 145 and the first shafts 1242 are rotatably accommodated in the first apertures 1462, i.e., the first key 14 is assembled with the connecting member 12. After that, the second key 16 is assembled to the connecting member 12 in a similar manner as that of the first key 14 being assembled to the connecting member 12.

Then, one of third shaft 1222 is accommodated in the third aperture 2223 of the second inner wall 2222, the other third shaft 1222 is moved in the guiding grooves 2224 until the other third shaft 1222 is accommodated in the aperture 2223 of the first inner wall 2221. The circuit board 30 is mounted to the bottom wall 24, thus yielding an assembled portable electronic device 100. At this stage, the first switch 32 is located in front of and parallel to the first key 16, the second switch 34 is located in front of and parallel to the second key 18.

Figure 4:
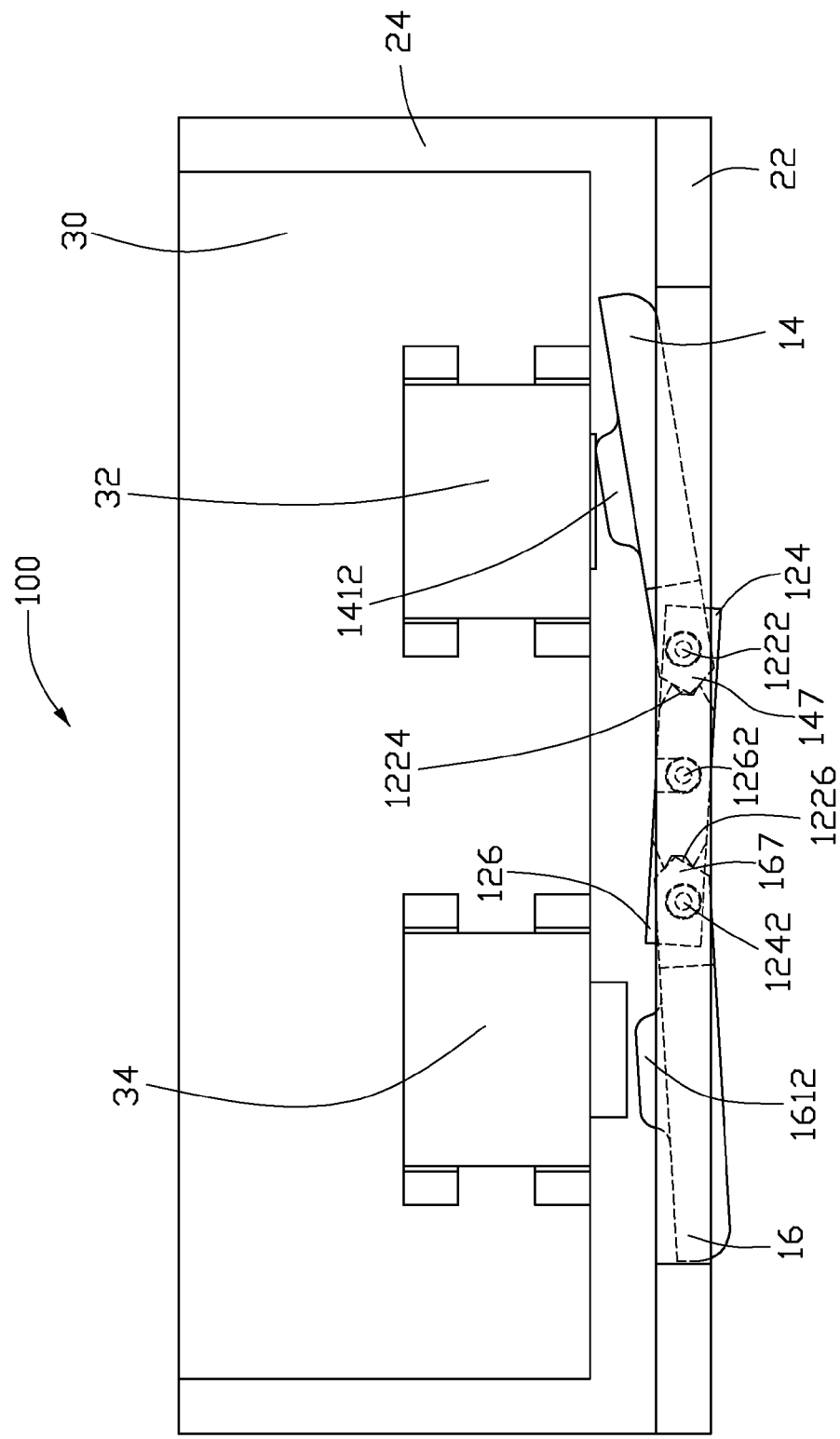
FIG. 4 is similar to FIG. 3, but one key being in pressed state.

Referring further to FIGS. 3 and 4, the use of the key assembly 40 will be described relative to first key 16. However, such action equally applies to the second key 18. First, the first key 16 is pressed toward the first switch 32 of the circuit board 30, so the first key 16 rotates about the first shaft 1242, to enter into the inner side of the peripheral wall 22, and the first contacting portion 1412 of the first key 16 move to trigger the switch 32. At this time, the first contacting portion 1412 and the first switch 32 are compressed to accumulate elastic force, the first protrusion 147 press the sidewall of the first slot 1224 so that the connecting member 126 is rotated about the third shafts 1262. As a result, the first connecting sections 124 are rotated out of the peripheral wall 24, the second connecting sections 126 are rotated into the peripheral wall 24, and the sidewall of the second slot 1226 presses the second protrusion 167 of the second key 18 into the peripheral wall 24, so the second key 18 is rotated about the second shafts 1262 out of the peripheral wall 24, and the second contacting portion 1612 move away from the second switch 34. Thereby a user's fingertip touches only one key section at a time, and removing the possibility of hitting two keys simultaneously. Once the first switch 32 is triggered, the first key 14 is released so that the connecting member 12, the first key 14 and the second key 16 are restored their original states by the elastic force of the first contacting portion 1412 and the first switch 32.

It is to be understood, however, that even though numerous characteristics and advantages of the exemplary disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A key assembly comprising:
   a base plate, the base plate having an opening defined therein;
   a connecting member, the connecting member rotatably accommodated in the opening;
   a first key, the first key rotatably hinged with a first hinge on one side of the connecting member; and
   a second key, the second key rotatably hinged with a second hinge on another side of the connecting member opposite to the first key;
   wherein when one of the first key and the second key is pressed, the pressed key is rotated towards the base plate and rotates the connecting member, and the connecting member rotates the non-pressed key away from the base plate.

2. The key assembly of claim 1, wherein the connecting member has two spaced first connecting sections protruding from one side thereof, the portions of the first key are located between the first connecting sections, each first connecting section has a first shaft protruding therefrom, the first key has two first apertures defined therein and configured to rotatably accommodate the first shafts.

3. The key assembly of claim 2, wherein the first key defines two first notches correspondingly facing the first connecting section, the first key defines one first bottom wall in each first notch, the first connecting sections are accommodated in the first notches, the first apertures are defined in the first bottom walls.

4. The key assembly of claim 2, wherein the connecting member defines a first slot between the first connecting sections facing the first key, the first key has a first protrusion protruding from one side thereof facing the connecting member, the first protrusion is rotatably accommodated in the first slot.

5. The key assembly of claim 4, wherein the protrusion is substantially V-shaped, and the slot is substantially trapezoidal.

6. The key assembly of claim 2, wherein the connecting member further has two spaced second connecting sections protruding from another side thereof, the portions of the second key are located between the second connecting sections, each second connecting section has a second shaft protruding therefrom, the second key has two second apertures defined therein to rotatably accommodate the second shafts therein.

7. The key assembly of claim 6, wherein the second key defines two second notches correspondingly facing the second connecting sections, the second key defines one second bottom wall in each second notch, the second connecting sections are accommodated in the second notches, the second apertures are defined in the second bottom walls.

8. The key assembly of claim 6, wherein the connecting member defines a second slot between the second connecting sections facing the second key, the second key has a second protrusion protruding from one side thereof and is rotatably accommodated in the second slot.

9. The key assembly of claim 8, wherein the protrusion is substantially V-shaped, and the slot is substantially trapezoidal.

10. The key assembly of claim 8, wherein the connecting member has two third shafts protruding from two opposite ends thereof, the base plate has a first inner wall and a second inner wall opposite to the first inner wall in the opening, the first inner wall and the second inner wall are both defined a third aperture therein to rotatably accommodate the third shafts therein.

11. The key assembly of claim 10, wherein the first inner wall has a guiding groove defined adjacent to the third aperture of the first inner wall, the guiding groove is configured to guide the third shafts to the aperture of the first inner wall.

12. The key assembly of claim 11, wherein the first inner wall defines two troughs adjacent two opposite sides of the guiding groove which facilitates guiding the third shaft into the third aperture.

13. A portable electronic device, comprising:
a circuit board having a first switch and a second switch mounted thereon; and a key assembly including:
a base plate, the base plate having an opening defined therein;
a connecting member, the connecting member rotatably accommodated in the opening;
a first key, the first key rotatably hinged with a first hinge on one side of the connecting member and configured to control the first switch; and
a second key, the second key rotatably hinged with a second hinge on another side of the connecting member opposite to the first key, the second key configured to control the second switch;
wherein when one of the first key and the second key is pressed, the pressed key is rotated toward the base plate and rotates the connecting member, the connecting member rotates the non-pressed key away from the base plate.

14. The portable electronic device of claim 13, wherein the connecting member has two spaced first connecting sections protruding from one side thereof, the portions of the first key are located between the first connecting sections, each first connecting section has a first shaft protruding therefrom, the first key has two first apertures defined therein and configured to rotatably accommodate the first shafts.

15. The portable electronic device of claim 14, wherein the first key defines two first notches correspondingly facing the first connecting section, the first key defines one first bottom wall in each first notch, the first connecting sections are accommodated in the first notches, the first apertures are defined in the first bottom walls.

16. The portable electronic device of claim 14, wherein the connecting member defines a first slot between the first connecting sections facing the first key, the first key has a first protrusion protruding from one side thereof facing the connecting member, the first protrusion is rotatably accommodated in the first slot.

17. The portable electronic device of claim 16, wherein the protrusion is substantially V-shaped, and the slot is substantially trapezoidal.

18. The portable electronic device of claim 14, wherein the connecting member further has two spaced second connecting sections protruding from another side thereof, the portions of the second key are located between the second connecting sections, each second connecting section has a second shaft protruding therefrom, the second key has two second apertures defined therein to rotatably accommodate the second shafts therein.

19. The key assembly of claim 18, wherein the second key defines two second notches correspondingly facing the second connecting sections, the second key defines one second bottom wall in each second notch, the second connecting sections are accommodated in the second notches, the second apertures are defined in the second bottom walls.

20. The key assembly of claim 18, wherein the connecting member defines a second slot between the second connecting sections facing the second key, the second key has a second protrusion protruding from one side thereof and is rotatably accommodated in the second slot.

* * * * *